United States Patent [19]

Leaphart

[11] 4,377,063
[45] Mar. 22, 1983

[54] DISPOSABLE GRASS CATCHER

[76] Inventor: John L. Leaphart, 709 Creekside Dr., Mount Pleasant, S.C. 29464

[21] Appl. No.: 201,810

[22] Filed: Oct. 29, 1980

[51] Int. Cl.³ .............................................. A01D 53/06
[52] U.S. Cl. ........................................ 56/202; 56/206
[58] Field of Search ............... 56/202, 16.6, 194, 199, 56/205, 206, 204, 203

[56] References Cited

U.S. PATENT DOCUMENTS

| | | | |
|---|---|---|---|
| 680,467 | 8/1901 | Shoemaker | 56/199 |
| 1,591,775 | 7/1926 | Perling | 56/194 |
| 2,747,356 | 5/1956 | Peterson | 56/202 |
| 2,878,508 | 3/1959 | Sedgwick et al. | 15/354 |
| 3,087,187 | 4/1963 | Hank et al. | 15/340 |
| 3,133,396 | 5/1964 | Leader | 56/202 |
| 3,212,248 | 10/1965 | Leader | 56/202 |
| 3,522,695 | 4/1970 | Musgrave | 56/16.6 |
| 3,624,989 | 12/1971 | Gatheridge | 56/202 |
| 3,634,904 | 1/1972 | Larsen | 15/340 |
| 3,716,977 | 2/1973 | Jackson | 56/202 |
| 3,722,192 | 9/1973 | Corbett | 56/202 |
| 3,777,461 | 12/1973 | Giraud | 56/202 |
| 3,802,173 | 4/1974 | Opitz | 56/202 |
| 3,874,152 | 4/1975 | Dahl | 56/202 |
| 3,916,608 | 11/1975 | Garrison | 56/202 |
| 3,934,392 | 1/1976 | Moery et al. | 56/202 |
| 3,952,484 | 4/1976 | Van Swearingen | 56/202 |
| 3,958,401 | 5/1976 | Carpenter | 56/202 |
| 3,961,467 | 6/1976 | Carpenter | 56/202 |
| 3,971,198 | 7/1976 | Lane | 56/202 |
| 3,974,631 | 8/1976 | Rhodes | 56/202 |
| 3,987,606 | 10/1976 | Evans | 56/202 |
| 4,030,273 | 6/1977 | Leader | 56/202 |
| 4,047,367 | 9/1977 | Thorud | 56/202 |
| 4,054,023 | 10/1977 | Carpenter | 56/202 |
| 4,095,398 | 6/1978 | Ammann et al. | 56/262 |
| 4,126,986 | 11/1978 | Kidd | 56/202 |
| 4,149,362 | 4/1979 | Haffner | 56/202 |
| 4,158,280 | 6/1979 | Thomas et al. | 56/202 |

Primary Examiner—Paul J. Hirsch
Attorney, Agent, or Firm—Saidman, Sterne & Kessler

[57] ABSTRACT

The grass catcher includes a disposable perforated catcher bag for connection to the discharge chute of a lawn mower. A catcher housing supports and surrounds the perforated bag in a manner which protects the mower operator and bystanders from being hit by projectiles which may pierce the bag. The housing includes a solid base pan which hooks onto the mower rear axle and a vertical shield which is hinged to the base and hooks onto a portion of the mower handle. A hood is hinged to the mower housing in a manner allowing it to cover the base pan and bag or be swung forward on the mower to expose the catcher bag. The shield can be unhooked and laid flat to provide greater exposure to the catcher bag. The mounting for the catcher allows for some vertical movement brought about by contact between the catcher base pan and the ground caused by the mower traversing rough or uneven terrain.

21 Claims, 4 Drawing Figures

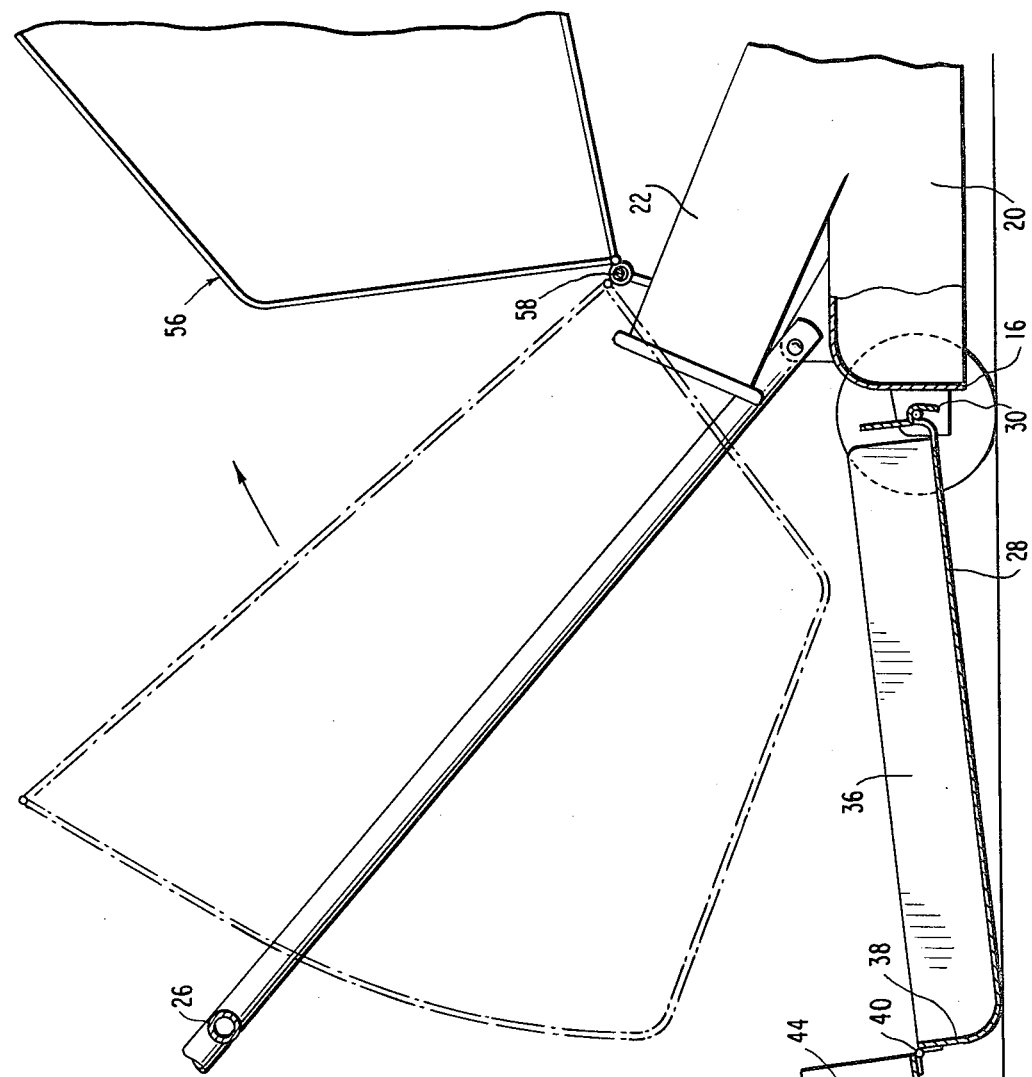
FIG.3
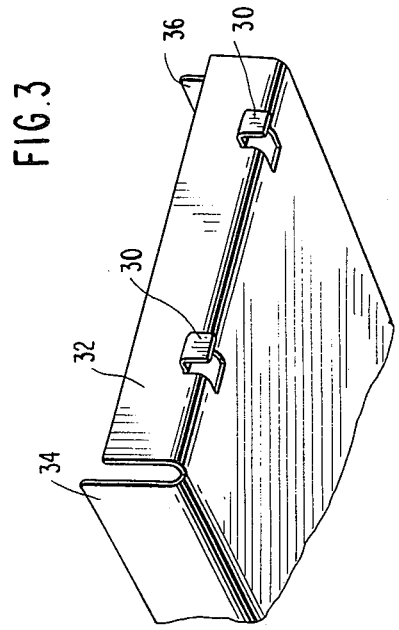
FIG.4
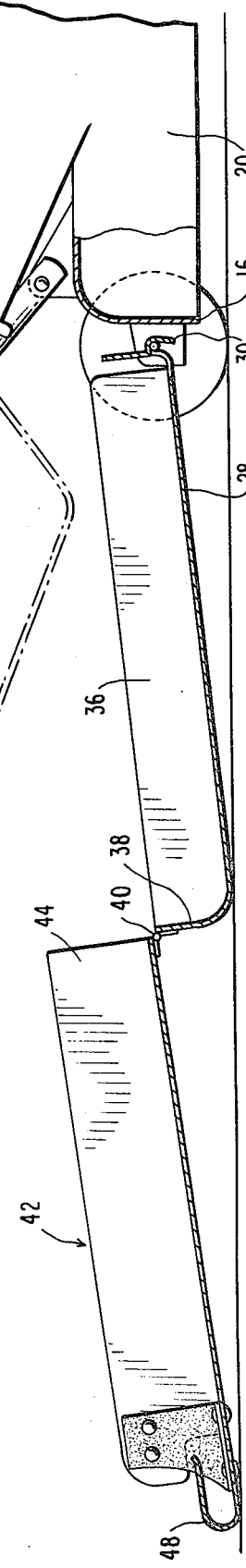

DISPOSABLE GRASS CATCHER

BACKGROUND OF THE INVENTION

1. Field of the Invention

The present invention relates generally to grass catcher arrangements for attachment to lawn mowers, and more particularly to grass catchers which are provided with a disposable catcher bag.

2. Discussion of the Related Art

It has become common practice to provide lawn mowers with a grass catcher bag which collects the clipped grass portions for later disposal. The most common type of such bag is produced from a durable, reusable material, such as loosely weaved nylon, and means are normally provided for permitting the bag to be readily attached or detached to the mower discharge opening. The bag must be periodically emptied into a suitable receptacle such as a garbage can or disposable garbage bag. The transferral of the clippings in this manner can prove to be a tedious task and, consequently, various devices have been suggested for eliminating the need for such transfer.

One such construction is shown in U.S. Pat. No. 3,874,152 to Dahl. The Dahl patent discloses the use of a disposable perforated bag for directly collecting the grass clippings from the mower discharge opening. The disposable bag is contained within a permanent outer carrier sack or bag and thus, the Dahl invention allows only restricted access to the disposable bag, making removal of the disposable bag difficult when it is filled with grass clippings.

Several arrangements have been suggested wherein grass clippings are forced upwardly through the discharge outlet to a position above the receptacle. The clippings then fall into the depending receptacle from which they can be removed. A disposable bag can be used to line the receptacle. Examples of this type of catcher assembly can be seen in U.S. Pat. No. 3,958,401 to Carpenter; U.S. Pat. No. 3,974,631 to Rhodes; U.S. Pat. No. 3,961,467 to Carpenter; U.S. Pat. No. 3,971,198 to Lane; U.S. Pat. No. 3,987,606 to Evans; U.S. Pat. No. 4,095,398 to Aumann et al; and U.S. Pat. No. 4,054,023 to Carpenter. These devices have the common deficiency of requiring the mower to raise the discharged particles to a substantial height above the ground prior to their deposit in the catcher bag.

U.S. Pat. No. 4,030,273 to Leader shows the use of a perforated catcher bag hung from the discharge chute of a lawn mower. The Leader device not only requires the grass clippings to be raised to a substantial height before they fall into the depending bag, but also provides no means for stopping projectiles which pass through the bag from striking the mower operator or bystanders.

U.S. Pat. No. 3,916,608 to Garrison discloses an apparatus for collecting grass cuttings comprising a disposable bag which is held in horizontal alignment with the lawn mower discharge port by a cradle. The bag is imperforate and therefore must allow air to enter and exit through the front opening. Also, no provision is made for stopping particles which pierce the bag.

Applicant is also aware of the conventional grass clipping or other debris catching apparatus shown in U.S. Pat. No. 2,878,508 to Sedgwick; U.S. Pat. No. 3,807,187 to Hank et al; U.S. Pat. No. 3,133,396 to Leader; U.S. Pat. No. 3,212,248 to Leader; U.S. Pat. No. 3,522,695 to Musgrave; U.S. Pat. No. 3,624,989 to Gatheridge; U.S. Pat. No. 3,634,904 to Larsen; U.S. Pat. No. 3,716,977 to Jackson; U.S. Pat. No. 3,722,192 to Corbett; U.S. Pat. No. 3,777,461 to Giraud; U.S. Pat. No. 3,802,173 to Opitz; U.S. Pat. No. 3,934,392 to Moery et al; U.S. Pat. No. 3,952,484 to Van Swearingen; U.S. Pat. No. 4,047,367 to Thorud; U.S. Pat. No. 4,127,986 to Kidd; and U.S. Pat. No. 4,158,280 to Thomas et al.

OBJECTS OF THE INVENTION

An object of the present invention is to provide a grass catcher apparatus for lawn mowers which can effectively contain clipped grass particles and other debris discharged from a lawnmower in a manner whereby the particles and other debris can easily be disposed of along with the bag in which they are caught.

Another object of the present invention is to provide a grass catcher apparatus for lawn mowers wherein access to the clipping and debris filled bag can easily be had by the operator.

A further object of the present invention is to provide a disposable grass catcher apparatus for lawn mowers wherein any particles or debris propelled by the lawn mower through the thin disposable bag will safely be contained within an outer housing in order that the operator and bystanders are protected.

An additional object of the present invention is to provide a disposable grass catcher for lawn mowers which can easily be attached to an existing lawn mower with only minor modifications.

SUMMARY OF THE INVENTION

In accordance with the above and other objects of the present invention, the disposable grass catcher includes a nonself-supported perforated disposable bag which can easily removably be attached to the discharge chute or opening of the lawn mower. The bag is supported by a base pan which removably attaches to the mower housing preferably by the use of a hook over the rear axle of the mower. The rear portion of the base pan is hingedly attached to a shield which includes a hook formed at its upper end for attachment to the lawn mower handle. The shield can be pivoted downwardly to allow rear access to the perforated disposable bag.

A hood comprising a metal framework covered with a durable net is pivotally attached at its front end to the mower housing so that the hood can be swung from a position covering the disposable bag to a position over the mower housing thereby enabling ready access to the bag from above.

The shield and base pan are each rigid to insure that no projectiles from the mower chute can pass through them. The shield also has resilient seals which engage the mower handle to close off any gaps that might exist in order to stop projectiles which may pierce the disposable bag. The hood also overlaps or abuts portions of the base pan and shield so that no gaps exist therebetween through which projectiles may pass.

Furthermore, the disposable bag may be formed from materials such as cellulose which are edible by grazing animals so that the bag and its contents can be used for animal feed with no further processing necessary.

BRIEF DESCRIPTION OF THE DRAWINGS

Various additional objects, features and attendant advantages of the present invention will become more fully appreciated as the same becomes better understood from the following detailed description and accompanying drawings wherein like reference numerals represent similar or identical components throughout the several views, and wherein:

FIG. 3 is a perspective, part fragmental view of the base pan showing the integral hooks; and FIG. 4 is an elevational view similar to FIG. 2 showing the catcher deployed in its open position for allowing access to the disposable bag.

DETAILED DESCRIPTION OF THE PREFERRED EMBODIMENT

Figure 1:
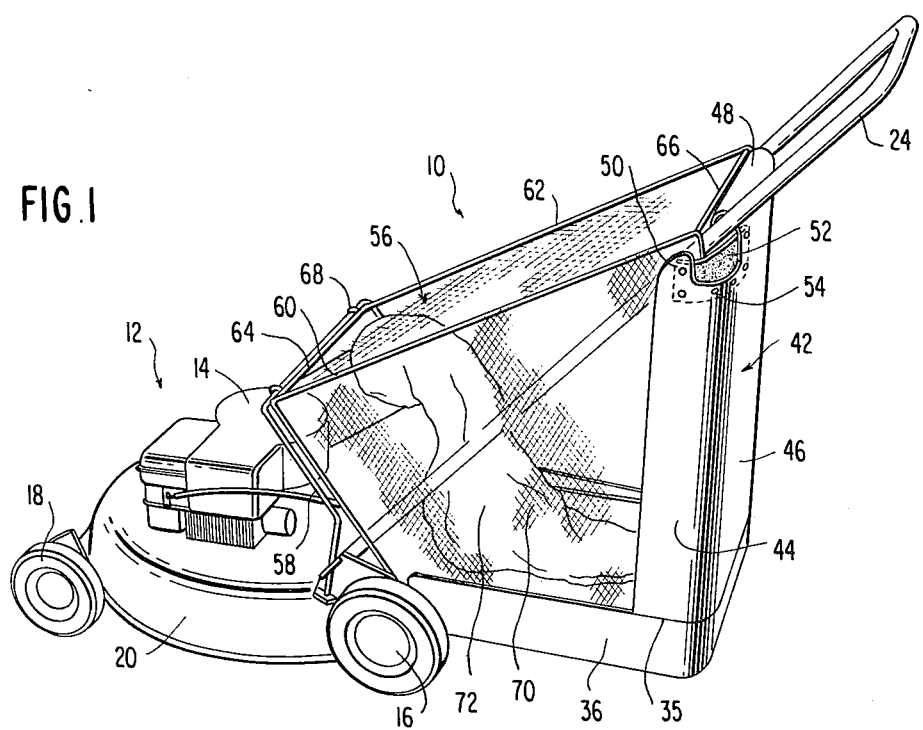
FIG. 1 is a perspective view of a lawn mower with the grass catcher of the present invention attached.
Figure 2:
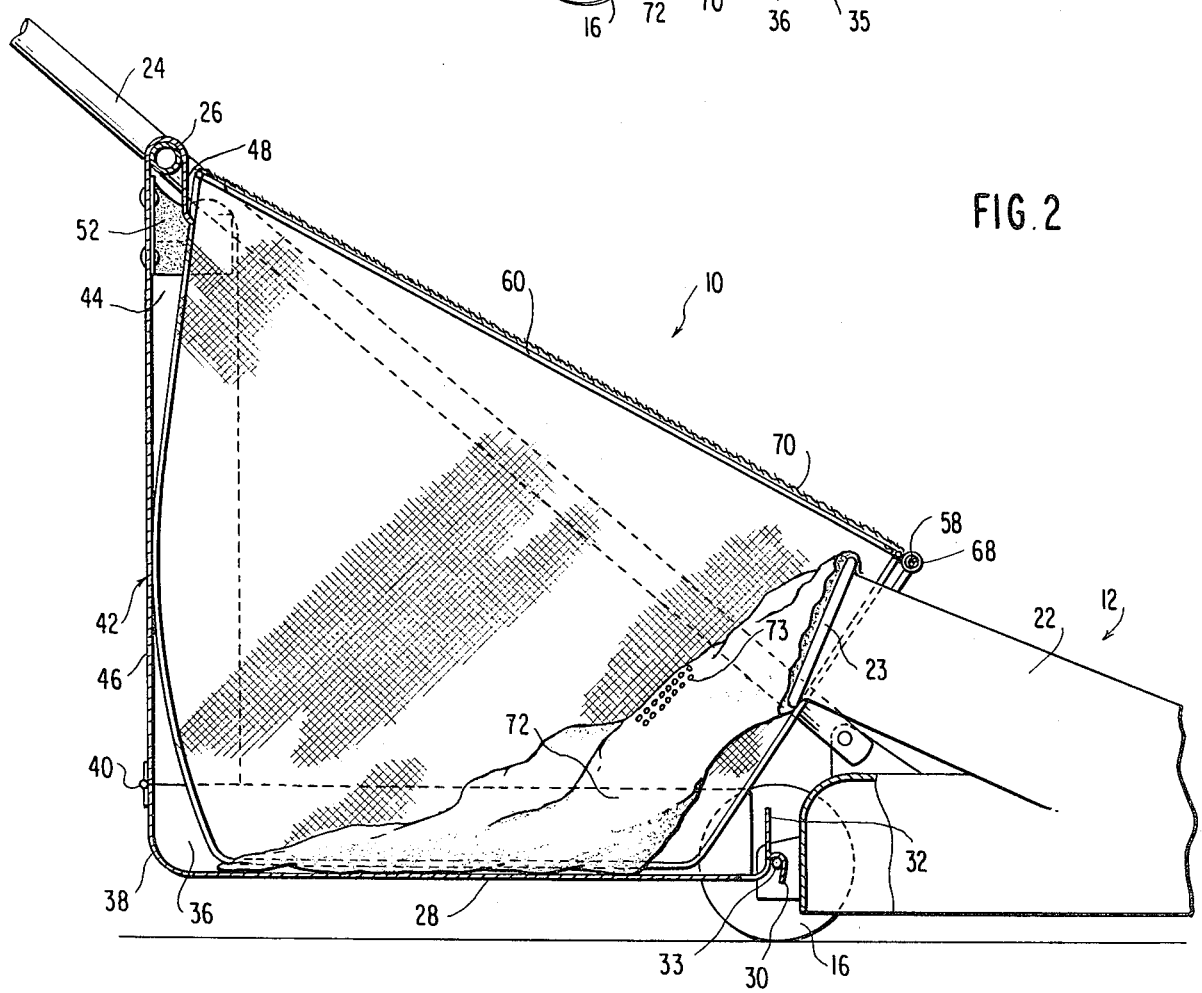
FIG. 2 is an elevational sectional view of the grass catcher showing its attachment to the lawn mower.

Now with reference to the drawings, a disposable grass catcher employing the principles and concepts of the present invention and generally referred to by the reference numeral 10 will be described in detail. With particular reference to FIG. 1, it can be seen that the catcher 10 is attached to a standard lawn mower 12. The lawn mower 12 includes an engine 14 which, for example, can be of the internal combustion or electric types. The engine 14 is mounted on a mower housing 20 having forward wheels 18 and rear wheels 16. In FIG. 2, it can be seen that a grass discharge chute 22 is formed integrally with the housing 20 and directs clipped grass particles rearwardly of the housing 20 in the direction of a handle 24.

The clipped particles forced through the discharge chute 22 enter a perforated bag 72, which can be any standardly available disposable bag formed from polypropylene or other suitable material. Bag 72 preferably includes a series of small holes, for example, approximately 1/16" in diameter, formed therein and shown at 73 to allow air to flow freely through bag 72 but to keep the grass clippings contained within bag 72. Bag 72 can be maintained on chute 22 in any convenient manner. As shown, a flange 23 is formed about the outer edge of chute 22, and an elastic band (not shown) is positioned over bag 72 and flange 23 for removably attaching bag 72 thereto. Accordingly, it can be seen that the discharge through chute 22 containing air and clippings will inflate bag 72 to its fullest potential with the clippings being held in bag 72 and the air being filtered out by the perforations.

Bag 72 is supported from below by a base pan 28 which can be formed from aluminum, hard plastic or other suitable material. Pan 28 contains mounting hooks 30 which can be formed integrally with a front wall 32 as shown in FIG. 3. Hooks 30 engage a rear axle 33 of mower 12 to hold the front of pan 28 in place, as depicted in FIG. 1. If no rear axle such as 33 is available, a rod (not shown) can be mounted to rear of the mower housing 20 to accommodate hooks 30.

Base pan 28 also contains a pair of laterally disposed side walls 34 and 36 which extend at least to the height of rear wheel 16 to insure that bag 72 will not contact the wheels when bag 72 is inflated. A rear wall 38 of base pan 28 is connected by a hinge 40 to a rear suspension shield indicated generally by reference numeral 42. Suspension shield 42 is also preferably formed from a rigid material, such as aluminum, plastic or other suitable material, and prevents any objects which might pass through the relatively thin disposable bag 72 from striking the operator of the mower standing directly to the rear of the shield 42. Shield 42 also functions to support the rear portion of base pan 28 by a hook 48 which is formed integrally with the top of shield 42. Hook 48 engages a cross brace 26 of handle 24. It should be noted that hook 48 is formed with sufficient length to accommodate the predicted vertical movement of the catcher when base pan 28 engages the ground when the mower 12 traverses rough or uneven terrain. It is also noted that a rear wall 46 of shield 42 abuts the upper edge of base pan rear wall 38 whereat it is attached by a hinge 40. The abutment of the shield 42 with base pan 28 assures that no gaps exist through which projectiles such as stones or the like which pass through the bag 72 could escape. In like manner, shield 42 contains lateral side walls 44 which abut the upper edge 35 of the base pan side walls 34 and 36 to insure that no gaps exist therebetween. Further, side walls 44 of shield 42 extend upwardly to form a lip 50 which engages the outer edge of handle 24. A flexible diaphragm 52 is preferably attached between the rear wall 46 of shield 42 and the associated side wall 44 to cover the gap therebetween. Diaphragm 52 can be attached by use of rivets 54 or any other suitable attachment device. Diaphragm 52 serves to seal this opening and also serves to cushion the vertical movement of base pan 28 and shield 42 when they contact rough terrain, thus insuring that the hook 48 will remain engaged with the cross member 26.

Again with reference to FIGS. 1 and 2, it will be seen that a hood 56 covers bag 72 and retains objects which may pierce bag 72 and travel upwardly or to the sides. The hood is pivotally mounted to a support rod 58 in order that it can be swung forwardly as depicted in FIG. 4 to allow access to the disposable bag 72 below.

Hood 56 comprises a frame structure including side frame members 60 and 62 interconnected by forward transverse frame member 64 and rear transverse frame member 66. Hinge loops 68 are mounted on forward transverse member 64 and rotatably engage support rod 58 to form the hinged coupling for hood 56. It should be noted that support rod 58 is mounted on the mower housing 20 in any convenient manner such as by the use of bolts or the like. The sides and top of the hood 56 are preferably covered with a netting material 70 which can be any suitable high strength netting such as nylon, fiberglass or the like. Thus, by use of hood 56 in conjunction with pan 28 and shield 42, bystanders on all sides of mower 12 are protected from flying objects which may pierce the bag 72. To ensure this protection, the hood sides walls should extend down to overlap the base pan side walls 34 and 36, and the hood should also extend rearward sufficiently to overlap shield side walls 44. The top of hood 56 should also extend sufficiently to the rear to abut hook 48 to insure that no gaps exist between hood 56 and shield 42 through which objects may pass.

In use, the grass catcher 10 can be easily mounted to lawn mower housing 20 by disposing base pan hooks 30 over rear axle 33 of the mower and attaching shield hook 48 to the handle cross member 26. Support rod 58 must be mounted to housing 20 and adjusted to insure that the hood 56 contacts base pan 28 and shield 42 appropriately. Perforated bag 72 is then simply attached to the discharge chute 22 of the mower, and is filled with grass clippings as the mower is operated.

The air with entrained clippings from chute 22 fills the bag 72, and the air absent the clippings passes through the perforations 73 formed in the bag 72. When the bag 72 becomes filled with clippings and other debris, hood 56 is swung forwardly as depicted in FIG. 4 and, if necessary, hook 48 is disengaged from cross member 26 and shield 42 is swung downwardly allowing base pan 28 and shield 42 to rest on the ground to afford greater access to allow removal of the debris filled disposable bag 72. If bag 72 is made from cellulose or other edible material, bag 72 and its contents can be consumed in whole by any of a variety of grazing animals.

Clearly, the configuration described affords a maximum of protection to bystanders as well as the mower operator. The solid shield 42 gives the operator positive protection from flying objects from chute 22, while the netting 70 of the cover protects bystanders and at the same time provides an essentially unrestricted path through which air can flow. In this manner, catcher bag 72 can be inflated to its fullest to accommodate the greatest quantity of grass clippings and other mower debris.

The design of the present invention should optimally provide for the volume beneath the hood 56 to be significantly greater than that of the fully inflated catcher bag 72. Such a design prevents the wall of the bag 72 from contacting any of the cover netting material 70. In this manner, none of the perforations in the bag 72 or openings in the netting 70 will be covered by solid portions of the other. Consequently, the air flow rate through the catcher 10 is kept high and the efficiency of the present invention is improved.

Another feature of the present invention that is significant is the hinged connection 40 between base pan 28 and shield 42. As noted above, this hinge joint 40 allows shield 42 to be swung down to allow greater access to catcher bag 72. This hinge joint 40 also allows the lower portion of the catcher 10, comprising base pan 28 and shield 42, to flex. This flexing affords a certain shock absorbing capability to the device when base pan 28 contacts the ground. Finally, when catcher 10 is not being used, shield 42 can be folded forward over base pan 28 to form a compact configuration which can be easily stored.

Obviously, numerous modifications and variations of the present invention are possible in light of the above teachings. It is therefore to be understood that within the scope of the appended claims, the invention may be practiced otherwise than as specifically described herein.

What is claimed is:

1. A grass clipping catcher for use with a lawn mower having a grass discharge chute, comprising:
   a non-self supporting perforated bag for attachment to said discharge chute;
   a base pan for supporting said bag and adapted to be connected to said mower;
   a shield hingedly attached to said base pan for movement between an upright position and a horizontal position; and
   a hood removably disposed over said base pan, said hood being disposed in abutting relation to said base pan and said shield.

2. The invention as defined in claim 1 wherein said hood includes a frame defining a top and opposing side walls, and mesh netting material being disposed on said frame.

3. The invention as defined in claim 1 wherein said base pan is rigid and includes attachment means for connection to said lawn mower.

4. The invention as defined in claim 3 wherein said attachment means comprises at least one hook formed integrally with said base pan.

5. The invention as defined in claim 2 wherein said frame has a hinged attachment means for connection to said lawn mower to allow said frame to swing from a position covering said base pan to a position uncovering said base pan.

6. The invention as defined in claim 1 wherein said bag is made from material edible by animals.

7. The invention defined in claim 6 wherein said material comprises cellulose.

8. The invention as defined in claim 1 wherein said shield includes resilient seal means for sealingly engaging said lawn mower to eliminate openings between said shield and said lawn mower.

9. In combination, a lawn mower having a mower housing, a rearwardly extending discharge chute formed on said housing, a handle extending rearwardly of said housing, and a grass clipping catcher comprising a non-self supporting perforated catcher bag having a mouth attached over said discharge chute and a catcher housing having a lower portion removably attached to said mower housing and said handle, said lower portion including a bag support section and a shield section, said bag support section and said shield section being hingedly interconnected to allow said shield section to move between an upright position and a horizontal position when said shield section is removed from said handle, and a cover removably resting on said lower portion.

10. The invention defined in claim 9 wherein said handle includes a cross member and said shield section includes a hooked upper end disposable over said cross member to form said attachment to said handle.

11. The invention defined in claim 10 and further wherein said mower housing includes a rearward transverse bar, said bag support section having a forwardly disposed hook for engagement with said bar to form said mower housing connection.

12. The invention as defined in claim 9 wherein said lower portion is formed from solid imperforate material and said cover includes a framework and netting attached to said framework.

13. The invention as defined in claim 9 wherein said cover includes a forward hinge attached to said mower having to allow said cover to swing from a position over said lower portion to a position covering said lower portion.

14. The invention as defined in claim 9 wherein said catcher bag is formed from material edible by animals.

15. The invention as defined in claim 9 wherein said shield includes resilient seal means for sealingly engaging said handle.

16. A grass clipping catcher for use with a lawn mower having a grass-discharge chute, comprising:
   a non-self supporting perforated bag for attachment to said discharge chute;
   a rigid base pan for supporting said bag;
   attachment means for connecting said base pan to said mower;
   a rigid shield including a lower end hingedly attached to said base pan for movement between an upright position and a horizontal position, and including an upper end having means for attaching said shield to said mower; and
   a hood removably disposed over said base pan, said hood being disposed in abutting relationship to said base pan and said shield, and including a frame defining a top and opposing side walls and mesh netting material being disposed on said frame.

17. A grass-clipping catcher as defined in claim 16 wherein said hood frame has hinged attachment means for connection to said lawn mower to allow said hood frame to swing from a position covering said base pan to a position uncovering said base pan.

18. A grass-clipping catcher as defined in claim 16 wherein said bag is made from material edible by animals.

19. A grass-clipping catcher as defined in claim 18 wherein said material comprises cellulose.

20. A grass-clipping catcher as defined in claim 16 wherein said rigid shield is solid and imperforate.

21. A grass-clipping catcher as defined in claim 16 wherein said rigid shield includes resilient seal means for sealingly engaging said lawn mower to eliminate openings between said shield and said lawn mower.

* * * * *